US008118142B2

(12) United States Patent
Redemann

(10) Patent No.: US 8,118,142 B2
(45) Date of Patent: Feb. 21, 2012

(54) BRAKE DEVICE, AS WELL AS BRAKE CARRIER AND BRAKE CALIPER, FOR SUCH BRAKE

(75) Inventor: Bernward Redemann, Hockenheim (DE)

(73) Assignee: WABCO Radbremsen GmbH, Mannheim (DE)

( * ) Notice: Subject to any disclaimer, the term of this patent is extended or adjusted under 35 U.S.C. 154(b) by 699 days.

(21) Appl. No.: 12/265,687

(22) Filed: Nov. 5, 2008

(65) Prior Publication Data
US 2009/0078513 A1 Mar. 26, 2009

Related U.S. Application Data

(63) Continuation-in-part of application No. 12/200,765, filed on Aug. 28, 2008.

(30) Foreign Application Priority Data

Aug. 28, 2007 (DE) .......................... 10 2007 040 586

(51) Int. Cl.
*B60T 1/06* (2006.01)
(52) U.S. Cl. .................................................... 188/73.39
(58) Field of Classification Search ............... 188/73.31, 188/73.39, 73.46, 73.47, 369, 370
See application file for complete search history.

(56) References Cited

U.S. PATENT DOCUMENTS

| 3,835,962 | A | 9/1974 | Falk | |
|---|---|---|---|---|
| 5,467,847 | A | 11/1995 | Antony | |
| 6,250,439 | B1 | 6/2001 | Matsuzaki | |
| 7,673,723 | B2 * | 3/2010 | Paul et al. | 188/73.31 |
| 7,673,724 | B2 * | 3/2010 | Baumgartner et al. | 188/73.31 |
| 7,874,405 | B2 * | 1/2011 | Blatt et al. | 188/73.39 |

FOREIGN PATENT DOCUMENTS

| DE | 102004045218 A1 | | 4/2006 |
|---|---|---|---|
| DE | 102004045223 B3 | | 6/2006 |
| DE | 102005059247 | * | 6/2007 |

* cited by examiner

*Primary Examiner* — Christopher Schwartz
(74) *Attorney, Agent, or Firm* — Schwabe Williamson & Wyatt

(57) ABSTRACT

The invention relates to a brake device for vehicles, in particular for utility vehicles, with a mounting device attachable to a stationary part of the vehicle, whereby the mounting device, when viewed along the brake axis, consists of two end sections and a first connection section in-between.
According to the invention it is provided that the first connection section has an opening for at least partial acceptance of a radial lug of the stationary part.

33 Claims, 2 Drawing Sheets

BRAKE DEVICE, AS WELL AS BRAKE CARRIER AND BRAKE CALIPER, FOR SUCH BRAKE

CROSS REFERENCE TO RELATED APPLICATIONS

The present application is a continuation-in-part of U.S. patent application Ser. No. 12/200,765 filed on 28 Aug. 2008, which claims international priority under 35 U.S.C. §119 to co-pending German Patent Application No. 102007040586.5 filed 28 Aug. 2007, entitled Bremsvorrichtung Sowie Bremsenträger und Bremssattel für eine Solche Bremsvorrichtung," the entire contents and disclosures of which are hereby incorporated by reference in their entirety.

TECHNICAL FIELD

The invention relates to a brake device for vehicles, in particular for utility vehicles, with a mounting device attachable to a stationary part of the vehicle, whereby:

The mounting device, when viewed along the brake axis, consists of two end sections and a first connection section in between.

DETAILED DESCRIPTION

A brake device of the kind described above is, for example, known from DE 10 2004 045 218 A1. In the known brake device, the mounting device is formed by a planar brake carrier. In other words, when assembled, it encroaches on a brake disc of the brake device. In the known braking device the first connection section is formed by a so-called connection yoke.

In the known brake device, the brake carrier which serves as a mounting device, is attached, for example, by bolting it together directly or through a so-called adapter with an axle arrangement which represents the stationary part of the respective vehicle.

Hereby, both end sections serve at the same time as guide and support of the brake lining on the force application side. They form together with the connection yoke a U-shaped embrasure.

Both end sections and the connection yoke have to withstand great stress and may not deform because of braking torque. This requires an appropriate material- and cross-section dimensioning.

Because the brake carrier, serving as mounting device, in its built-in state is on the force application side together with the connection yoke, it is necessary to have axial clearance in order to guarantee free rotation of the brake disc.

The invention is based on the objective to develop said braking device further, in such a way, that even in case of axial and/or radial tight clearances it is stabile and easy to manufacture. In other words, the braking device is built such, that assembly is improved.

Furthermore, it is objective of the invention to devise a brake carrier and a brake caliper for said brake device.

According to the invention, the objective is achieved by the first connection section having an opening for at least partial acceptance of a radial lug of the stationary part.

In other words, the spaces axial before and after the radial lug are used to house the first connection section. Especially, placement of a portion of the first connection section on the radial lug on the side facing the vehicle permits a narrower design of the portion of the first connection section on the side of the rim of the radial lug so that, for example, the brake disc may be placed axially closer to the radial lug. With axial expansion of the portion of the first connection section on the side of the rim of the radial lug being unchanged, increased stability for the first connection section is achieved through the portion on the other side.

Through the opening in the first connection device a closed structure is formed which embraces a radial outer section of the radial lug forming a frame in such a manner that a section of the radial lug may extend into the open structure. By inserting this section into the opening of the first connection device not only space is conserved in the radial direction, but also its torsional rigidity is increased by the frame-like structure of the first connection section. With increased stability, also a reduction of the cross-section may take place. The area of the first connection section facing the brake disc may be build narrower since the other section contributes to the stabilization. This leads to a largely improved assembly. As there is no additional space requirement in the radial direction because of the interlocking, there is also no interference with the area of the brake lining or with the area of its guide.

The opening, with appropriate design, may also improve the assembly, as the brake device may be placed radially. Interlocking with its convenient tight fit limits movements in axial as well as in radial direction. This facilitates attachment, for example, of screw connections, without the aid of holding/positioning aides. Since the radial lug of the stationary portion is axially in for the most part the same section as the layer guide, potential tilting may efficiently be prevented.

Here, it should be pointed out that that the end sections are the part of the mounting device which, on one hand, features devices for mounting onto the stationary part of the vehicle, such as, for example, receivers for screws or the like, and which, on the other hand, absorbs the longitudinal forces during braking and passes them on to the vehicle.

In top view, the opening is preferably elongated. This design aides the assembly.

In top view, the opening is, according to the invention, even more preferably rectangular. The design facilitates its manufacture.

According to a particularly preferred embodiment of the invention the opening is a passage. This also aids assembly.

Furthermore preferred according to the invention, the radial lug, when assembled, does not extend beyond the radial outer boundary of the opening. In other words, it does not extend in an area where there are brake linings and/or pressure plates.

In a view along the braking axle the first connection section is preferably arch-shaped. This also saves space.

More preferred according to the invention the first connection section in its assembled state is located on a first side of the brake disc, whereby furthermore preferred according to the invention, the first side is the force application side of the brake device. This also saves space.

According to the invention, the mounting device may be designed principally in any way possible. For example, it may be plate-like. However, it may also feature a second connection section between both end sections, especially on the rim side of the brake device. In other words, the invention may also be applied to frame-like designs of the mounting device, whereby the mounting device embraces the brake disc in a frame-like manner and has sections not only on the force application side but also on the rim side.

The first end section may feature a first guiding device for a brake lining and/or pressure plate. In other words, according to this design the mounting device serves to hold and/or guide a brake lining and/or a guide plate.

In the same manner, a second end section may feature a second guiding device for a brake lining and/or pressure plate.

Hereby, further preferred according to the invention, the first and/or second guiding device feature(s) (each) a guide pin.

According to the invention, particularly preferred, both guiding devices together with the first connection section confine an embrasure. Therefore, there is no detrimental interference with the typical guide system of known brake devices.

Preferably, the embrasure is U-shaped. In other words, the respective areas extend at the guide pins in a parallel fashion, so that a U-shaped or rectangular contour is formed to guide the brake lining and/or pressure plates.

According to the invention, the mounting device may be attached in any way to the stationary part. According to one embodiment of the invention, it is attached to the stationary part via an adapter. This offers, for example, the possibility to attach a brake device according to the invention in form of a disc brake to an axle design as stationary part that was originally designed for attachment of a drum brake.

According to another preferred embodiment of the invention, the stationary part and/or the adapter feature(s) (a) rest and support area(s) for the first and/or second end section. These rest and support areas serve to provide relief to or replace axial screw connections with which the mounting device is attached to the adapter/the stationary part.

Hereby the rest and support area(s) is/are shifted in axial direction with respect to the radial lug. This saves material. Also the axial length may be reduced again.

According to the invention, the mounting device is preferably a brake carrier or a brake caliper.

In addition to the aforementioned description of a brake device, the invention also provides a brake carrier as well as a brake caliper for such brake device.

DESCRIPTION OF THE DRAWINGS

In the following, the invention is described in more detail by way of description of examples of preferred embodiments in conjunction with accompanying drawings. Hereby

Figure 1:
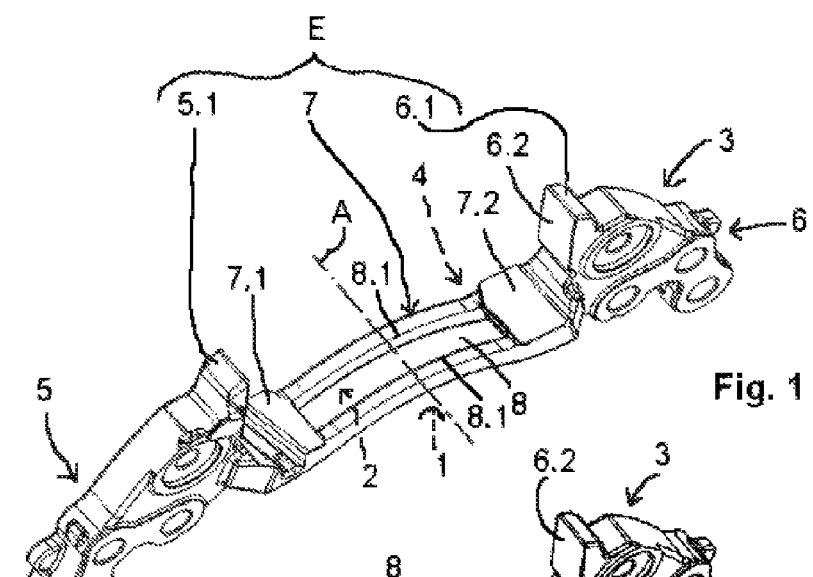
FIG. 1 shows a schematic perspective view of a mounting device designed as planar brake carrier according to the invention.
Figure 2:
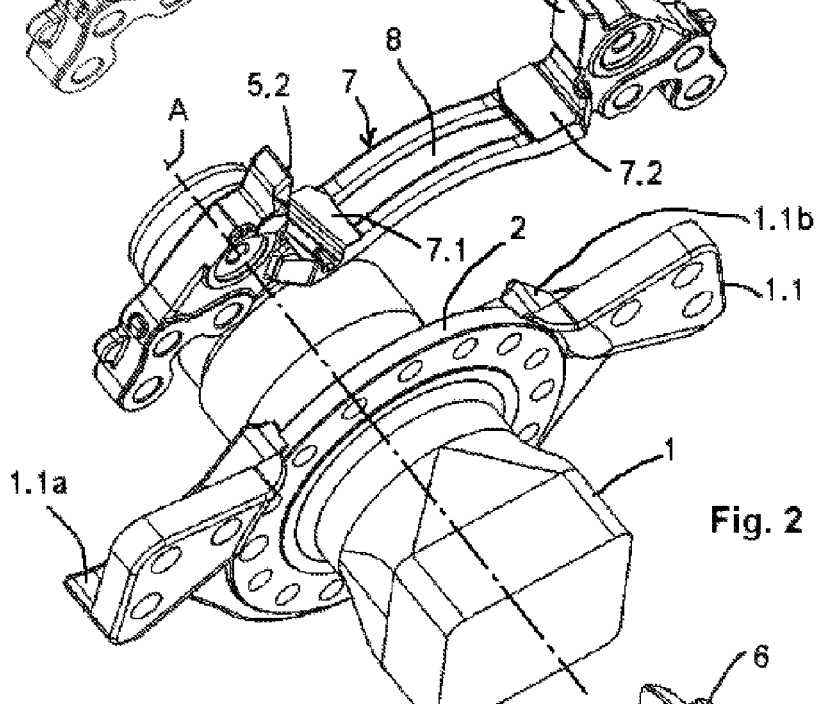
FIG. 2 shows said mounting device together with a stationary part of the vehicle.

Adapter 1.1 features flanges 1.1 *a* and 1.1 *b*, on which brake carrier 3 rests when assembled. Flanges 1.1 and 1.1 *b* may be used for tangential or radial screw connections.

Brake carrier 3 features two end sections 5 and 6. The two end sections include guide pins 5.1 and 6.1 with guiding areas 5.2 and 6.2, respectively. A connection yoke 7 serves as connection section between end sections 5 and 6. Connection yoke 7 features guiding areas 7.1 and 7.2 as well as an elongated opening 8. When assembled (FIG. 3), radial lug 2 extends into elongated opening 8.

Guiding areas 5.2, 6.2, 7.1, 7.2 serve to guide a brake lining 4 (not shown in the drawing). Together they form a U-shaped embrasure, because guiding areas 5.2 and 6.2 are mostly placed parallel to each other.

When assembled, the outer contour of radial lug 2 does not extend beyond the outer boundary 8.1 of connection yoke 7 in the area of the elongated opening 8. Therefore, brake lining 4 or an additional or alternate pressure plate added to brake carrier 3 cannot collide with radial lug 2. Overall, this results in an improved fitting and, also the brake disc (not shown), in the drawing located to the left of brake carrier 3, can move axially closer to radial lug 2 because the material cross-section of the axially outer parts of connection yoke 7 may be reduced significantly.

Figure 4:
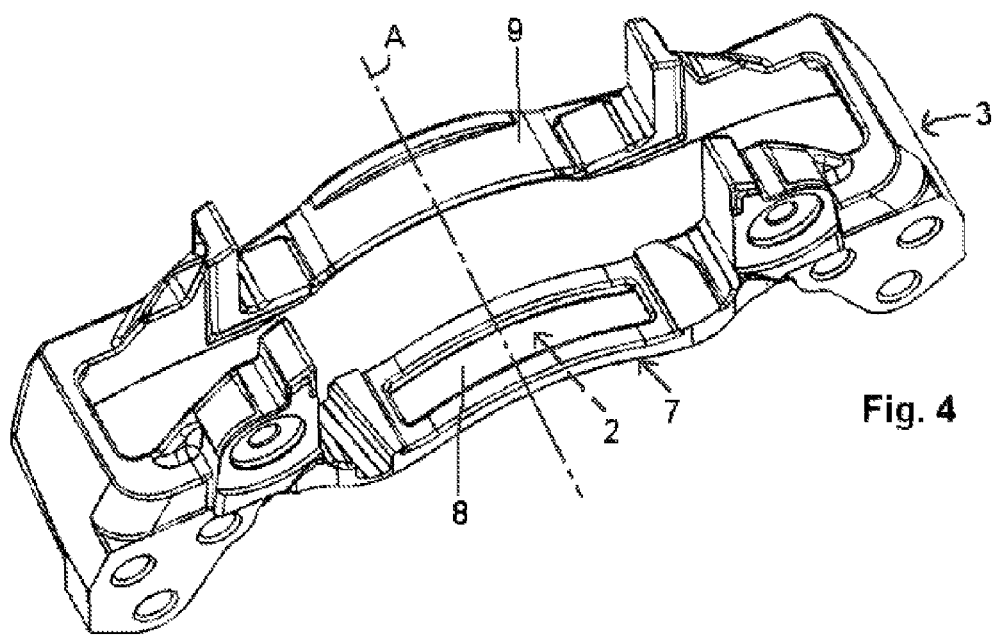
FIG. 4 shows a frame-shaped embodiment of the brake device as brake carrier.
Figure 5:
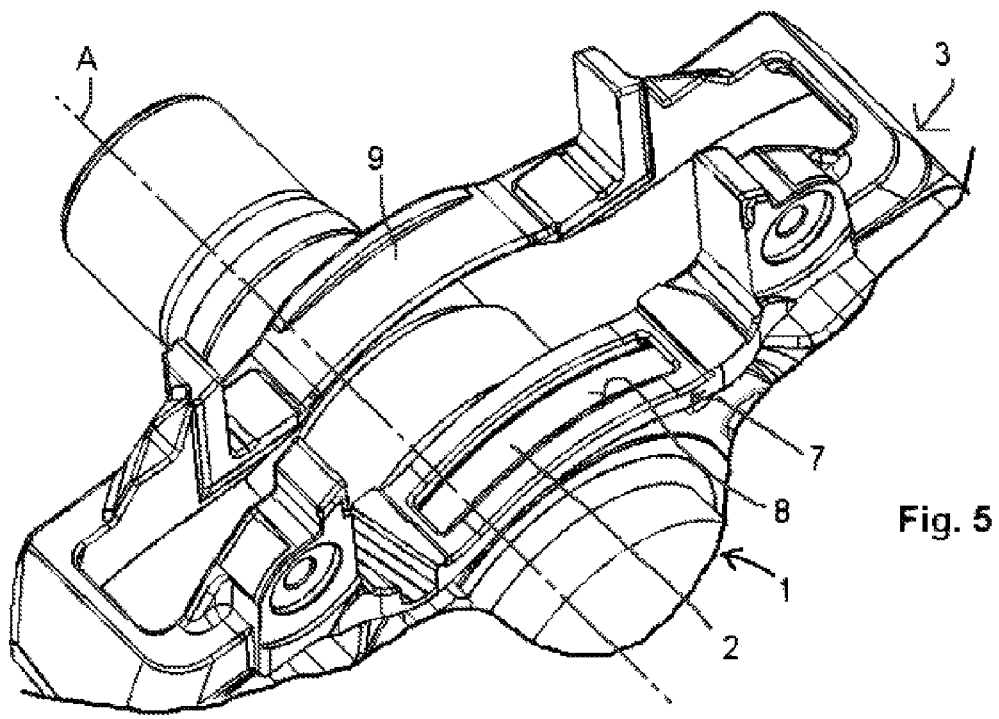
FIG. 5 same view as FIG. 4, however when attaching to a vehicle axle with a radial lug In the drawings, reference number 1 refers to the stationary part of a utility vehicle. The stationary part is the vehicle axle. The geometric axis is labeled with reference letter A. Radial lug 2 is attached to vehicle axle 1, for example, by welding. Radial lug 2 is a drilled rotor such as one that is, for example, used for mounting drum brakes. An adapter 1.1 and the drilled rotor are bolted together using the holes. The adapter carries a planar brake carrier 3 that serves as mounting device. To attach brake carrier 3 to the adapter 1.1, axial screw connections are used (screws are not shown). The said axial screw connections may also be supplemented or replaced by other means of attachment, for example, by tangential or radial screw connections with screw axes being parallel to the plane of the disc. With appropriate design, a tight fit for improvement of the transfer of braking torque is achieved. The adapter is not necessarily required. Moreover, the invention also relates to designs, in which brake carrier 3 which is serving as mounting device, is directly attached to vehicle axle 1 or to radial lug 2.

FIGS. 4 and 5 show a brake device 3 designed as a frame-shaped brake carrier which embraces the brake disc (not shown) in a frame-like manner. It serves on both sides of the brake disc to guide/support brake linings of known designs. The connection yoke 7 located on the force application side contains said elongated opening 8, so that due to the identical functions and assembly it may be referred to the said details including their advantages. The other connection yoke is labeled with reference number 9.

Figure 3:
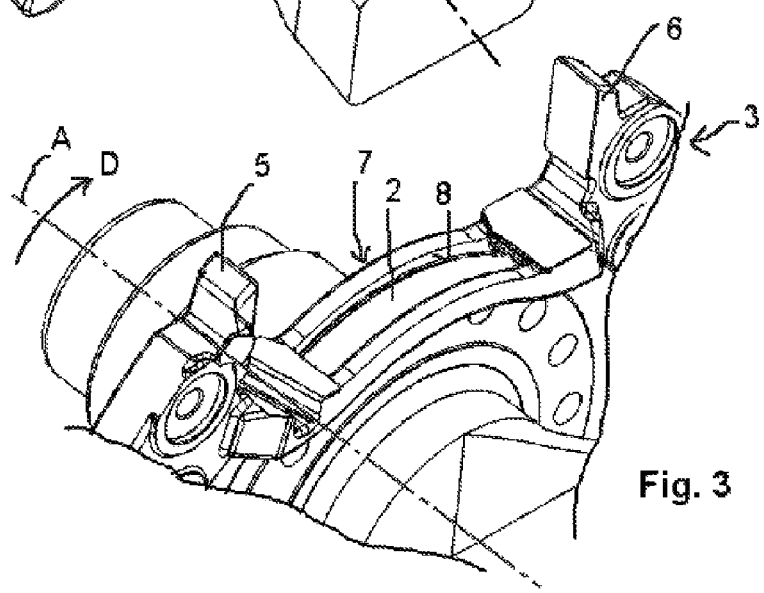
FIG. 3 shows the mounting device when assembled.

FIG. 3 shows that connection yoke 7 together with said embrasure 8 are located in the same axial area as radial lug 2 which offers an additional advantage with respect to flux—for example, when introducing braking torque—because said components are not placed axially in front of each other like in the state-of-the-art. Of course, this applies also for the embodiment according to FIGS. 4 and 5.

The preferred rotation direction is labeled D.

To bring to realization the various embodiments of the invention, the features of the invention disclosed in the description, the claims as well as in the drawings may be relevant individually or in any combination.

The invention claimed is:

1. A brake device for utility vehicles, with a mounting device attachable to a stationary part of the vehicle, comprising:
   the mounting device, when viewed along the brake axis (A), includes a first end section, a second end section, and a first connection section in-between the first end section and the second end section,
   wherein the first connection section includes an opening at least partially receiving a radial lug of the stationary part when mounted.

2. The brake device of claim 1, wherein the mounting device is attached to the stationary part via an adapter.

3. The brake device of claim 2, wherein the adapter includes a rest and support area for the second end section.

4. The brake device of claim 2, wherein the adapter includes a rest and support area for the first end section.

5. The brake device of claim 2, wherein the adapter includes a rest and support area for the first and second end section.

6. The brake device of claim 1, wherein the first end section includes a first guiding device for a brake lining.

7. The brake device of claim 6, wherein the first guiding device includes a guide pin.

8. The brake device of claim 6, wherein the second guiding device includes a guide pin.

9. The brake device of claim 6, wherein the first and the second guiding device include a guide pin.

10. The brake device of claim 1, wherein the opening is a passage.

11. The brake device of claim 10, wherein the radial lug, when assembled, does not extend beyond a radial outer boundary of the opening.

12. The brake device of claim 1, wherein the first connection section is on a first side of the brake disc, when assembled.

13. The brake device of claim 12, wherein the first side is a force application side of the brake device.

14. The brake device of claim 1, wherein the mounting devices includes a second connection section between the two end sections.

15. The brake device of claim 14, wherein the second connection section is on a rim side of the brake device.

16. The brake device of claim 1, wherein the second end section includes a first guiding device and a second guiding device for a brake lining, and wherein the first guiding device and the second guiding device together with the first connection section embrace an embrasure.

17. The brake device of claim 16, wherein the embrasure is U-shaped.

18. The brake device of claim 1, wherein the stationary part includes a rest and support area for the first and second end sections.

19. The brake device of claim 18, further comprising rest and support area(s) that are shifted in axial direction with respect to the radial lug.

20. The brake device of claim 1, wherein the opening in top view is elongated.

21. The brake device of claim 1, wherein the opening in top view is rectangular.

22. The brake device of claim 1, wherein the first connection section is arch-shaped when viewed along the brake axis.

23. The brake device of claim 1, wherein the second end section includes a second guiding device for a brake lining.

24. The brake device of claim 1, wherein the mounting device is a brake carrier.

25. A brake carrier for a brake device of claim 1.

26. A brake caliper for a brake device of claim 1.

27. The brake device of claim 1, wherein the first end section includes a first guiding device for a pressure plate.

28. The brake device of claim 1, wherein the first end section includes a first guiding device for a brake lining and a pressure plate.

29. The brake device of claim 1, wherein the second end section includes a second guiding device for a pressure plate.

30. The brake device of claim 1, wherein the second end section includes a second guiding device for a brake lining and a pressure plate.

31. The brake device of claim 1, wherein the stationary part includes a rest and support area for the first end section.

32. The brake device of claim 1, wherein the stationary part includes a rest and support area for the second end section.

33. The brake device of claim 1, wherein the mounting device is a brake calliper.

* * * * *